United States Patent [19]
Cordy, Jr.

[11] 4,456,950
[45] Jun. 26, 1984

[54] CURRENT SPIKE PROTECTION CIRCUIT FOR SWITCH-MODE POWER SUPPLIES

[75] Inventor: Clifford B. Cordy, Jr., Corvallis, Oreg.

[73] Assignee: Hewlett-Packard Company, Palo Alto, Calif.

[21] Appl. No.: 387,054

[22] Filed: Jun. 10, 1982

[51] Int. Cl.³ .............................................. H02P 13/22
[52] U.S. Cl. ........................................ 363/26; 363/56
[58] Field of Search ................. 363/25, 26, 56, 80, 363/97

[56] References Cited

U.S. PATENT DOCUMENTS

| | | | |
|---|---|---|---|
| 3,657,631 | 4/1972 | Martens et al. | 363/26 |
| 3,859,586 | 1/1975 | Wadlington | 363/56 |
| 4,253,138 | 2/1981 | Shelly et al. | 363/56 |
| 4,322,817 | 3/1982 | Kuster | 363/26 |
| 4,404,623 | 9/1983 | Jourdan | 363/97 |

Primary Examiner—William H. Beha, Jr.
Attorney, Agent, or Firm—Jeffery B. Fromm; Roland I. Griffin

[57] ABSTRACT

A circuit which prevents the flow of excess spikes of magnetization current in the primary windings of a transformer used in a switch mode power supply is disclosed. The circuit comprises an AC coupled, peak detecting, negative feedback path from a current sensing resistor in the primary windings of the transformer to the input of the voltage regulator so that as excess primary winding current spikes begins to flow the driving switches on the transformer primary are rapidly turned off thereby preventing any further rise in transformer primary current.

3 Claims, 7 Drawing Figures

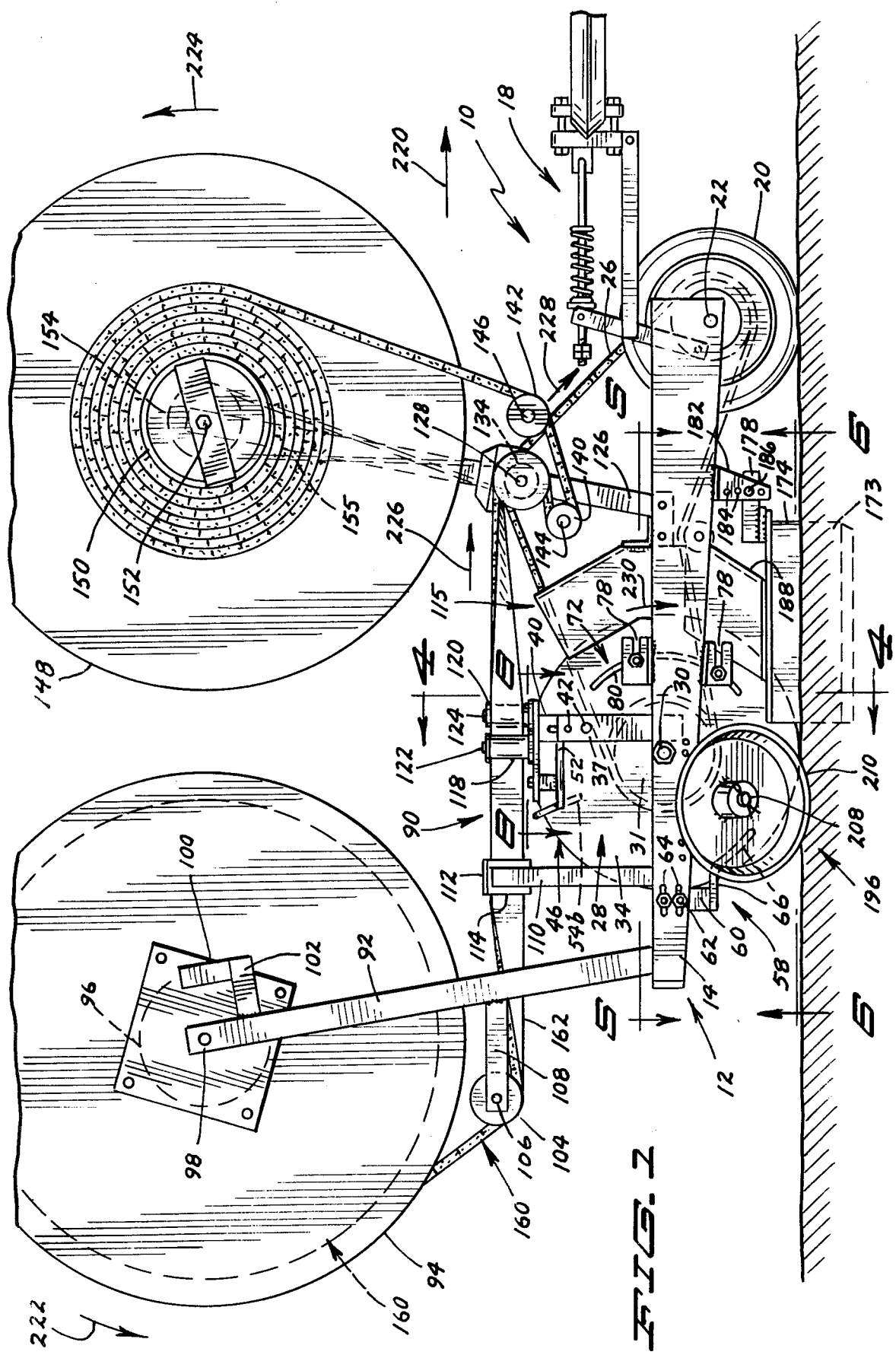

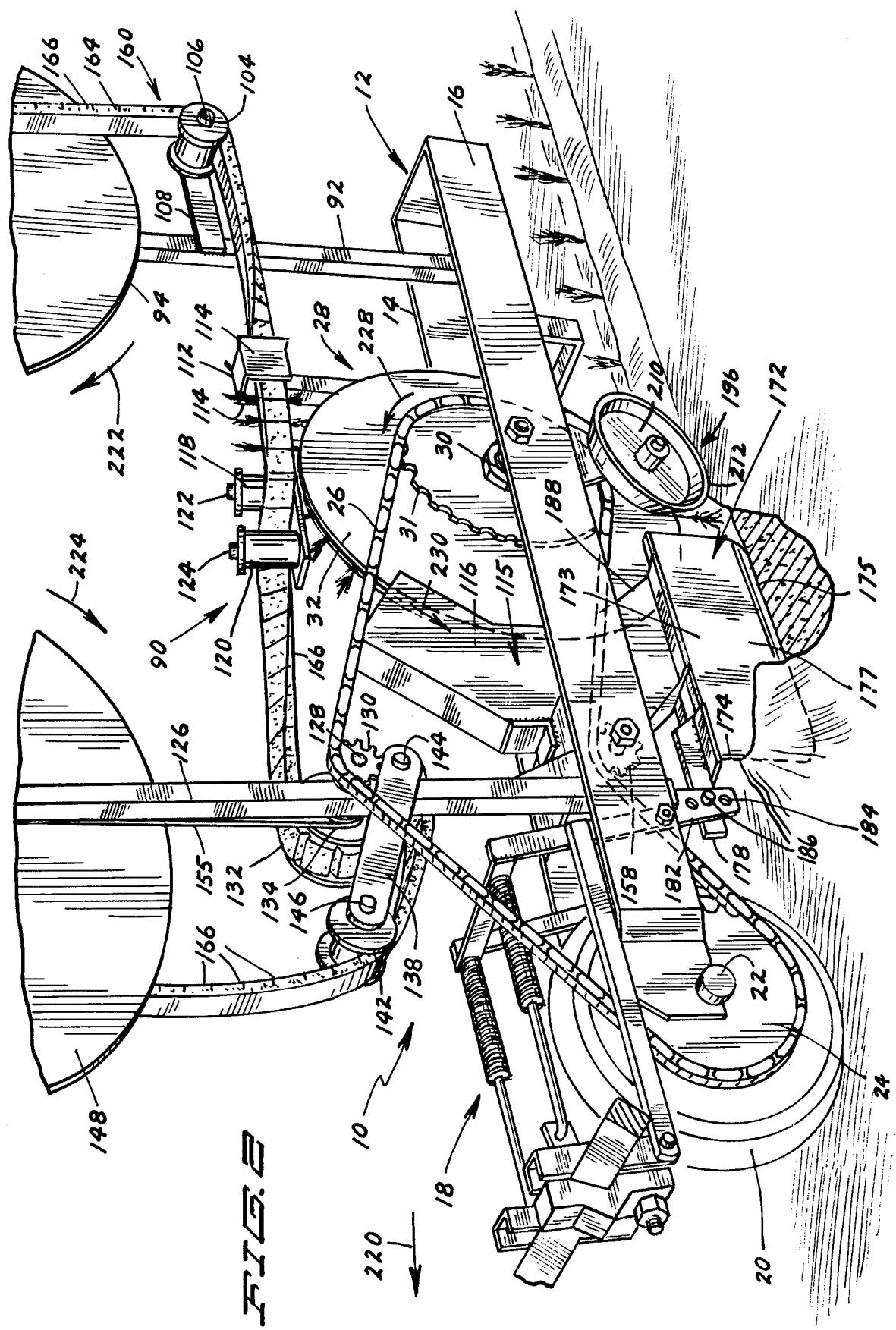

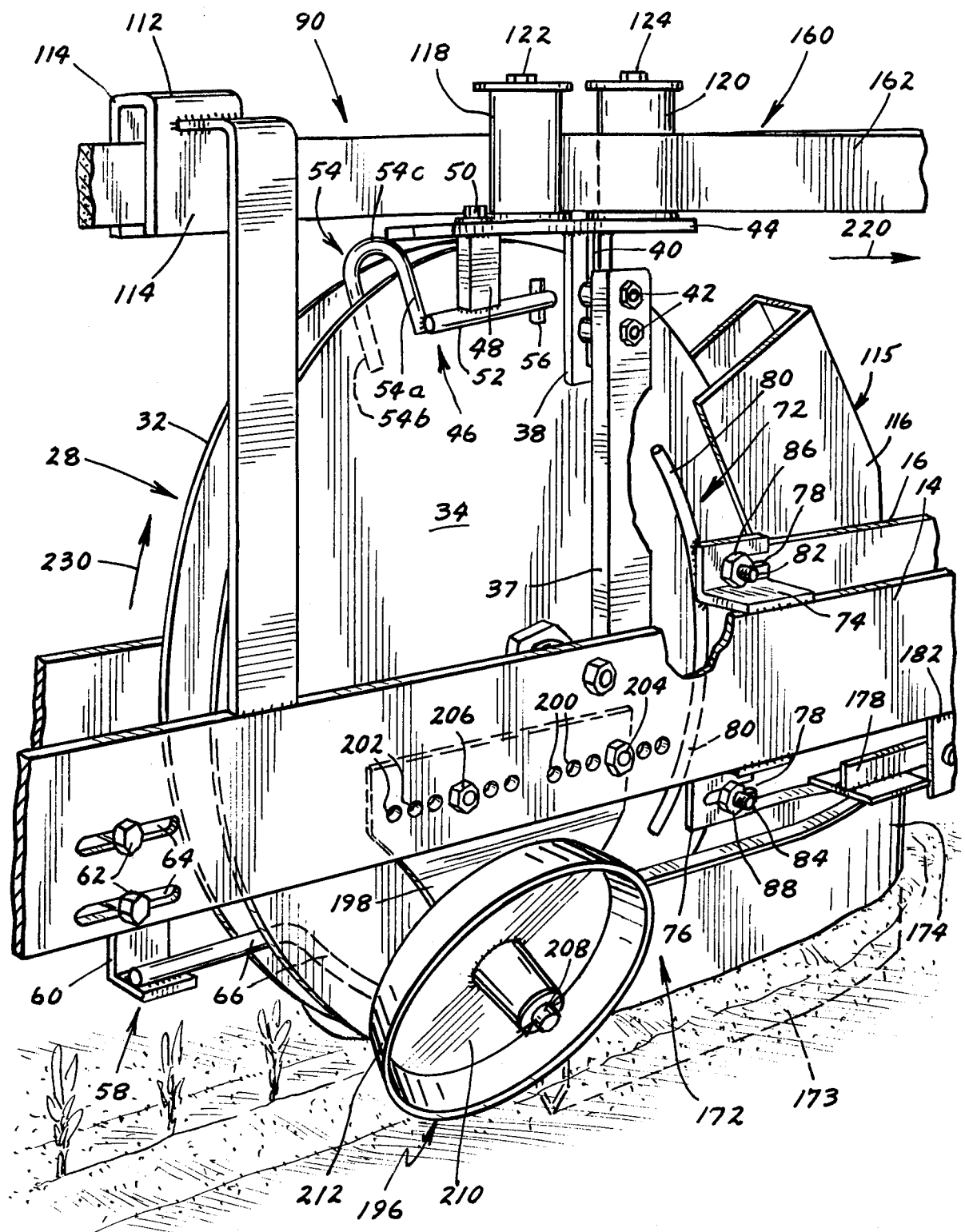
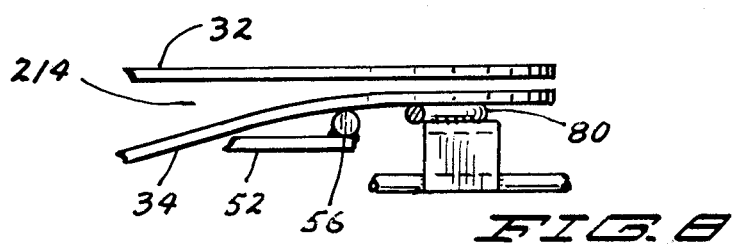

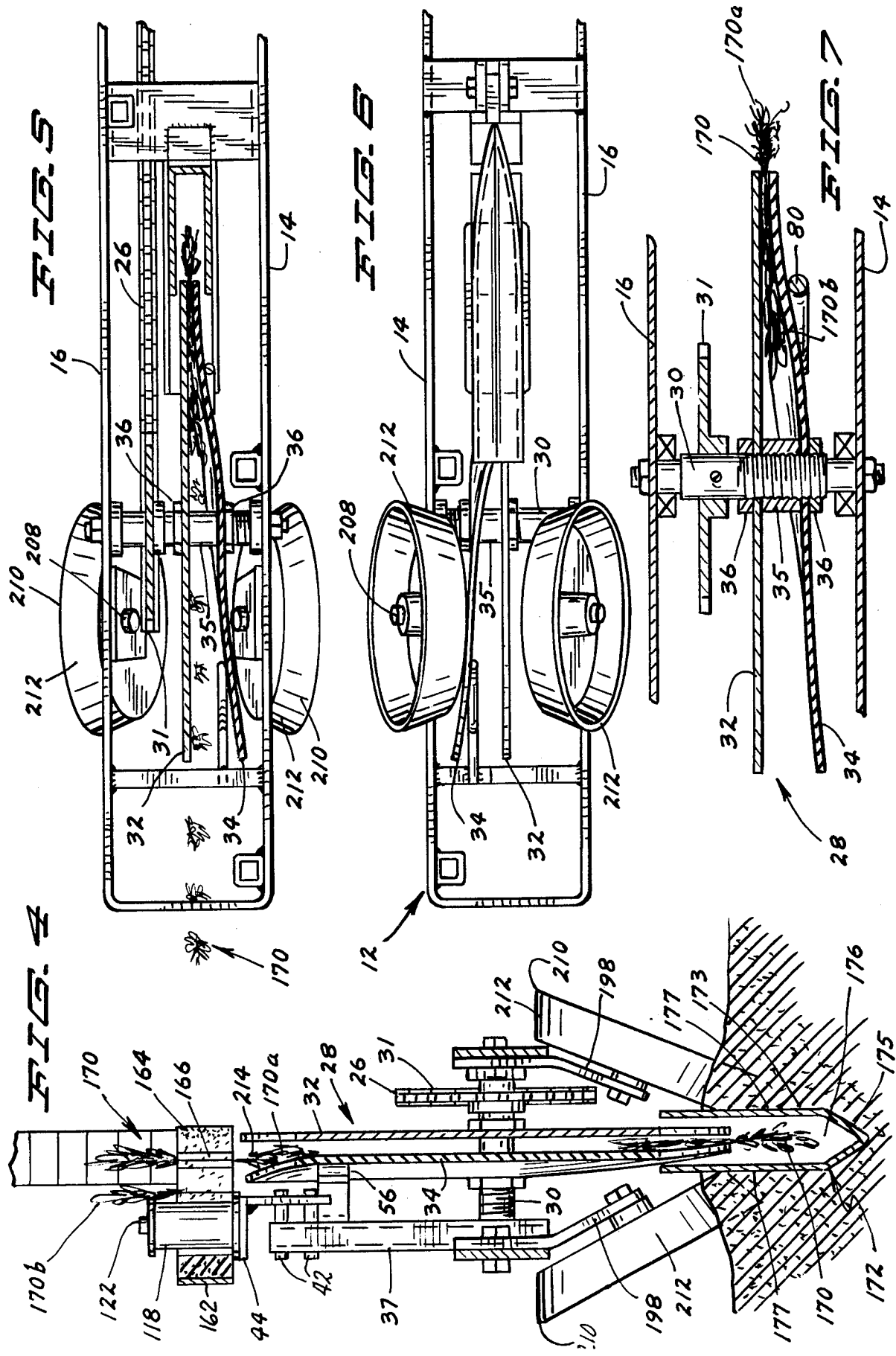

CURRENT SPIKE PROTECTION CIRCUIT FOR SWITCH-MODE POWER SUPPLIES

BACKGROUND OF THE INVENTION

Many power supplies today contain switches driving a transformer in order to efficiently convert either an unregulated voltage supply (B+) to one or more regulated output supplies or to shift the voltage level between a high voltage input and a low voltage output or a low voltage input to a high voltage output. These supplies are usually referred to as switch mode power supplies, and the switching drive, often called a chopper, is usually a semiconductor— either a bipolar transistor or a field effect transistor (FET). It should be noted that the claimed invention is not limited in application to semiconductor choppers, but is generally applicable to any switch mode supply which can employ the use of negative feedback to maintain a constant output voltage.

A switch mode power supply differs from a classical power supply chiefly in the use of these chopper switches which can operate at frequencies significantly higher than the typical power line frequency of 50 or 60 hertz. Once this higher frequency alternating current (a.c.) voltage is generated, typically at 8–40 kilohertz, a much smaller, lighter, and less expensive transformer can be employed than would be necessary for the same level of power conversion at 50 or 60 hertz.

One significant problem in any supply is the fact that the transformer itself should never have a net d.c. voltage impressed across its primary. If such a net d.c. voltage exists across the transformer primary, an enormous current can build up since the d.c. impedance of the transformer primary is only limited by the resistance of the primary windings themselves.

Unfortunately, in practice it is very difficult to perfectly balance the chopper in a switch mode supply, which leads to the creation of an unwanted net d.c. voltage on the transformer primary. Some sources of imbalance are:

1. Difference in the two halves of the transformer primary.
2. Differences in the saturation voltage of the driving switches.
3. Nonsymetry in the driving waveform.
4. Differences in the storage time of the driving switches.

The transformer primary circuit will automatically average over all such imbalances and a current spike will occur which will force the d.c. voltage on the transformer primary to zero. This spike in current is often referred to as "ratcheting".

Thus, at the end of the chopper cycle the transformer core will saturate due to a primary imbalance and the magnetizing current will abruptly rise toward infinity. At a high enough current level, an "on" chopper switch will come out of its "on" state resulting in significant heating in this supposedly "on" device. ("On" refers to a switch which is conducting current with a very low voltage drop, as opposed to an "off" switch is in its nonconducting state. Semiconductor switches are also capable of a third "active" state, in which current will flow while the voltage across the switch is at some intermediate level between the two power terminals.) Thus, if the actual current spike does not itself damage the switch, the resulting internal heating will.

Various methods have been employed to reduce the ratchet effect based either on the use of larger magnetic cores or complex magnetic paths to prevent transformer saturation. These methods work, but they make the transformer significantly more complex and/or expensive. The disclosed invention is both inexpensive and easily implemented with the use of readily available electronic components and can practically eliminate the ratchet effect.

SUMMARY OF THE INVENTION

In accordance with the illustrated preferred embodiment, the present invention provides a means for continuous protection of a switch mode power supply from spikes of magnetization current caused by saturation in the coupling transformer. A novel feedback scheme is utilized which senses potentially damaging spikes of magnetization current and inhibits the transformer driving switches so that it is not necessary to carefully balance the transformer primary.

DETAILED DESCRIPTION OF THE DRAWINGS

FIG. 1 is a typical semiconductor drive in a switch mode power supply.

FIG. 2 is a typical waveform showing the unregulated supply current through the transformer primary versus time when no ratcheting problem exists.

FIG. 3 is the same type of waveform as FIG. 2 when ratcheting is occurring.

FIG. 4 is an overall block diagram of a switch mode power supply showing an actual application of the anti-ratchet circuit claimed in this invention.

FIG. 5 is a more detailed diagram of a typical switch mode voltage regulator driver and a classical over current protection circuit.

FIG. 6 is a schematic showing an actual implementation of the anti-ratchet circuit in accordance with this invention.

FIG. 7 is a waveform showing an actual implementation of the anti-ratchet circuit in accordance with this invention.

DETAILED DESCRIPTION OF THE INVENTION

The block diagram of a switch mode power supply with the claimed anti-ratchet circuit 22 is shown in FIG. 4. To understand the operation of the anti-ratchet circuit 22 as shown, it is necessary to understand how a typical switch mode voltage regulator 1 operates. FIG. 5 is a more detailed block diagram of one such voltage regulator as used in FIG. 4. The difference between the output voltage (Vo) and a reference voltage (Vref) is amplified by an error amplifier 2. The output of the error amplifier 2 is compared by a comparator 3 to a ramp generated by an oscillator 4. The output of the comparator 3 is steered by a flip-flop 5 and two NOR logic gates 6 and 7 to turn on one or the other of the output transistors 8 and 9 of FIG. 4. The duty cycle of the "on " time of transistors, 8 and 9, is decreased as the output voltage (Vo) exceeds the reference voltage (Vref). The output transistors, 8 and 9, are the switches which constitute the chopper drivers on the primary of the switching transformer 10.

A rectifier, shown in FIG. 4 as four diodes 16–19, and appropriate output filters, shown as two inductors 30 and 31 and two capacitors 20 and 21 on the secondary of the transformer 10, completes the actual switch mode power supply.

To protect the chopper driving switches 8 and 9, an instantaneous over current protection circuit 11 is often incorporated. When the current through the current sense means, here a resistor 12, exceeds a preset level the transistor 13 in the instantaneous over current protection circuit 11 will be biased "on" by resistors 14 and 15. When transistor (13) is turned "on" the comparator (3) and NOR gates, 6 and 7, will turn "off" the driving switches, 8 and 9. This classical over current protection will, in itself, protect against extreme ratchet conditions as well as many other extreme types of faults. However, the instantaneous over current protection 11 is a very coarse form of protection which is incapable of preventing ratcheting which is at a serious, but not disastrous level.

If the signal from the over current sensing means 12 is fed back into the summing junction of the voltage regulator 1, any tendency to ratchet will be reduced by modifying the duty cycle into the driving switches 8 and 9. Thus, if there is a voltage pulse on the summing junction corresponding to a spike in magnetizing current in the transformer 10, the output of the error amplifier 2 in FIG. 5 will be abruptly dropped below the level of the ramp from oscillator 4 and the output switches 8 and 9 will be turned off just as if the output voltage (Vo) had abruptly increased beyond Vref. Unfortunately, as soon as the current through the sense means 12 is turned "off", the error amplifier 2 output will again exceed the ramp voltage and the output switches 8 or 9 are turned "on" again.

To avoid this immediate turn on, a peak detecting means is incorporated into the anti-ratchet circuit. In FIG. 6, diode 25, capacitor 26 and resistor 27 consitute one such peak detecting means. As the signal from the current sense means 12 increases, the voltage across capacitor 26 will also increase, thus following the upward swings in the signal. Diode 25 acts as a rectifier preventing the signal from following the downward swing in current through the current sense means 12 as the switches 8 and 9 turn "off". Resistor 27 acts as a bleed resistor to reduce the voltage across capacitor 26 so that the error amplifier 2 and comparator 3 can be ready for a subsequent duty cycle pulse from the oscillator 4. This is shown as the time constant ($\tau$) in FIG. 7 and $\tau$ is equal to the product of the values of capacitor 26 and resistor 27. Thus, by the appropriate choice of $\tau$, the anti-ratchet circuit can function over a wide range of duty cycles which arises due to changes in the d.c. voltage source (B+).

An adjustment is also required as part of the feedback to set the appropriate amount of gain from the current sensing means 12. As shown in FIG. 6, this adjustment is accomplished by resistor 28. If resistor 28 is too small, the entire supply of FIG. 4 will oscillate. If resistor 28 is too large, the anti-ratchet circuit looses its effectiveness. The value of resistor 28 depends strongly on the overall design of the power supply and it is easiest to determine its value empirically.

It is also desirable to have the anti-ratchet function perform over a wide range of d.c. load current on the output of the power supply (Vo). This is done by a.c. coupling the anti-ratchet circuit 22 to the summing junction of the voltage regulator 1. One implementation of this a.c. coupling is accomplished by capacitor 29 in FIG. 6. The ratchet current spikes are then sensed at the same level of magnetizing current independent of load current. Normally, the output filter capacitors 20 and 21 are large enough so that capacitor 29 can be anywhere in a large range of values. Thus, the desired a.c. coupling can be accomplished as long as capacitor 29 is small enough so that the anti-ratchet circuit 22 does not sense normal changes in load current.

Finally, it is desirable to prevent false triggering of the anti-ratchet circuit 22 due to the normal switching operation of switches 8 and 9. This is accomplished by inserting a low pass filter between the current sensing means (12) and the peak detecting circuit (diode 25, capacitor 26, and resistor 27) as shown in FIG. 6. The filter, shown as resistor 23 and capacitor 24, typically will have a time constant about ten times the time constant of the product of resistor 23 and capacitor 26. Thus, the time constant of resistor 23 and capacitor 26 is fast enough so that the anti-ratchet circuit 22 can follow the rise of the magnetizing current through the current sensing means 12 under ratchet conditions without being distorted by the low pass filter composed of resistor 23 and capacitor 24.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

I claim:

1. In a power supply having a source of direct current voltage, a transformer having at least one primary and at east one secondary winding, a rectifier connected in series with said secondary winding, an output inductance connected to the output of said rectifier, an output capacitance connected to the output of said inductance, switching means for alternately applying pulses of direct current voltage from said direct current voltage source to said primary winding, and voltage regulating means responsive to the voltage across said output capacitance for varying the percentage of on time of said switching means so as to maintain the voltage across said output capacitance constant, the said power supply being such that one or more of said pulses of direct current voltage causes current to flow in said primary winding so that said primary winding will reach magnetic saturation thereby causing the current through said primary winding to increase in the form of peaks to a level where said current can damage the switching means through which said current flows, wherein the improvement comprises:

means for deriving a signal having an alternating current component, said signal corresponding to the current flowing through said primary winding;

means for detecting the peak of said current signal, said peak detecting means having a time constant such that the peak detected signal can decay prior to the occurrence of a subsequent peak of current through said primary winding; and feedback means for selectively coupling the alternating current component of the output of said peak detecting means to said voltage regulating means so as to cause said voltage regulating means to inhibit said switching means as the output of said peak detector increases beyond a predetermined limit.

2. A power supply as set forth in claim 1 further comprising:

a filter means connected between said primary current detecting means and said peak detecting means to block high frequency signals associated with the normal operation of said switching means.

3. In a power supply having a source of direct current voltage, a transformer having at least one primary and at least one secondary winding, a rectifier connected in series with said secondary winding, an output inductance connected to the output of said rectifier, an output capacitance connected to the output of said inductance, switching means for alternately applying pulses of direct current voltage from said direct current voltage source to said primary winding, and voltage regulating means responsive to the voltage across said output capacitance for varying the percentage of on time of said switching means so as to maintain the voltage across said output capacitance constant, the said power supply being such that one or more of said pulses of direct current voltage causes current to flow in said primary winding so that said primary winding will reach magnetic saturation thereby causing the current through said primary winding to increase in the form of peaks to a level where said current can damage the switching means through which said current flows, wherein the improvement comprises:

- means for deriving a signal corresponding to the current flowing through said primary winding;
- means for detecting the peak of said current signal, said peak detecting means having a time constant such that the peak detected signal can decay prior to the occurrence of a subsequent peak of current through said primary winding;
- feedback means for coupling the output of said peak detecting means to said voltage regulating means so as to cause said voltage regulating means to inhibit and switching means as the output of said peak detector increases beyond a predetermined limit; and
- filter means connected between said primary current detecting means and said peak detecting means to block high frequency signals associated with the normal operation of said switching means.

* * * * *

UNITED STATES PATENT AND TRADEMARK OFFICE
CERTIFICATE OF CORRECTION

PATENT NO. : 4,456,950

DATED : June 26, 1984

INVENTOR(S) : Clifford B. Cordy, Jr.

It is certified that error appears in the above—identified patent and that said Letters Patent is hereby corrected as shown below:

Column 1, line 62, after "switch" insert -- which --;

Column 3, line 61, delete the hyphen after the word "function";

Column 4, line 31, "east" should read -- least --;

Column 6, line 13, "inhibit and switching" should read -- inhibit said switching --.

Signed and Sealed this

Thirtieth Day of October 1984

[SEAL]

Attest:

GERALD J. MOSSINGHOFF

Attesting Officer     Commissioner of Patents and Trademarks